United States Patent
Li

(10) Patent No.: US 7,359,409 B2
(45) Date of Patent: Apr. 15, 2008

(54) PACKET LOSS CONCEALMENT FOR VOICE OVER PACKET NETWORKS

(75) Inventor: Dunling Li, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 437 days.

(21) Appl. No.: 11/047,747

(22) Filed: Feb. 2, 2005

(65) Prior Publication Data

US 2006/0171373 A1    Aug. 3, 2006

(51) Int. Cl.
*H04J 3/06* (2006.01)
(52) U.S. Cl. .................... 370/516; 704/219
(58) Field of Classification Search .............. None
See application file for complete search history.

(56) References Cited

U.S. PATENT DOCUMENTS

| | | | |
|---|---|---|---|
| 5,884,010 A * | 3/1999 | Chen et al. ............... | 704/228 |
| 6,104,998 A * | 8/2000 | Galand et al. ............. | 704/500 |
| 6,801,532 B1 * | 10/2004 | Anandakumar et al. .... | 370/394 |
| 6,967,946 B1 * | 11/2005 | Tackin et al. ............. | 370/352 |
| 7,308,406 B2 * | 12/2007 | Chen ......................... | 704/262 |
| 2005/0058145 A1 * | 3/2005 | Florencia et al. .......... | 370/412 |
| 2006/0122830 A1 * | 6/2006 | Lee et al. .................. | 704/229 |
| 2006/0271373 A1 * | 11/2006 | Khalil et al. .............. | 704/500 |
| 2007/0206645 A1 * | 9/2007 | Sundqvist et al. ......... | 370/516 |

* cited by examiner

*Primary Examiner*—Phirin Sam
(74) *Attorney, Agent, or Firm*—Steven A. Shaw; W. James Brady; Frederick J. Telecky, Jr.

(57) ABSTRACT

A method to reduce memory requirements for a packet loss concealment algorithm in the event of packet loss in a receiver of pulse code modulated voice signals. Packet losses are concealed by using the spectral analysis filter memory to smooth a signal gap and by using a technique for determining a maximum repeatable waveform range instead of using the pitch period to reproduce lost packets. The invention uses fewer processing resources and results in improved performance compared to a packet loss concealment algorithm under G.711 Appendix I standards.

14 Claims, 3 Drawing Sheets

PACKET LOSS CONCEALMENT FOR VOICE OVER PACKET NETWORKS

CROSS-REFERENCE TO RELATED APPLICATIONS

None

FIELD OF THE INVENTION

The present invention relates generally to providing packet loss concealment in the event of packet loss over a communications network. More specifically, the present invention be used to replace the methods performed by an ITU G.711 Appendix I packet loss concealment algorithm.

BACKGROUND OF THE INVENTION

In a packet-switched network, a packet of data often traverses several network nodes as it goes across the network in "hops." Each packet has a header that contains destination address information for the entire packet. Since each packet contains a destination address, they may travel independent of one another and occasionally become delayed or misdirected from the primary data stream. If delayed, the packets may arrive out of order. The packets are not only merely delayed relative to the source, but also have delay jitter. Delay jitter is variability in packet delay, or variation in timing of packets relative to each other due to buffering within nodes in the same routing path, and differing delays and/or numbers of hops in different routing paths. Packets may even be actually lost and never reach their destination.

Voice over Packet (VOP) networks and Voice over Internet Protocols (VOIP) are sensitive to delay jitter to an extent qualitatively more important than for text data files for example. Delay jitter is one of the important factors that causes packet loss in a network. Packet loss can produce interruptions, clicks, pops, hisses and blurring of the sound and/or images as perceived by the user, unless the delay jitter problem can be ameliorated or obviated. Packets that are not literally lost, but are substantially delayed when received, may have to be discarded at the destination nonetheless because they have lost their usefulness at the receiving end. Thus, packets that are discarded, as well as those that are literally lost, are all called "lost packets." Packet loss is a common source of distortion in VOIP.

Packet loss causes the degradation of speech quality as perceived by a user. From an end-user's point of view, the experience of even a single click or pop during a conversation will greatly reduce the user's satisfaction level with the quality of the entire conversation period. This is true regardless of whether the speech quality is good or excellent most of the time during the call. Customers of telephony services will simply remember the once or twice during a call that degradation was perceived and rate the entire call as poor quality. Thus, from an end-user's point of view even a single instance of quality degradation has a severely damaging effect on call quality. The user can rarely tolerate as much as half a second (500 milliseconds) of delay. For real-time communication some solution to the problem of packet loss is imperative, and the packet loss problem is exacerbated in heavily-loaded packet networks. Also, even a lightly-loaded packet network with a packet loss ration of 0.1% perhaps, still requires some mechanism to deal with the circumstances of lost packets.

Due to packet loss in a packet-switched network employing speech encoders and decoders, a speech decoder may either fail to receive a frame or receive a frame having a significant number of missing bits. In either case, the speech decoder is presented with the same essential problem—the need to synthesize speech despite the loss of compressed speech information. Both "frame erasure" and "packet loss" concern a communication channel or network problem that causes the loss of the transmitted bits.

Packet loss concealment (also called frame loss concealment) algorithms hide losses that occur in packet networks by reconstructing the signal from the characteristics of the past signal. These algorithms reduce the click and pops and other artifacts that occur when a network experiences packet loss. PLC improves the overall voice quality in unreliable networks.

One standard recommendation to address this problem is the International Telecommunication Union (ITU) G.711 standard "Pulse Code Modulation (PCM) of Voice Frequencies. G.711 Appendix I is an international standard that uses pulse code modulation (PCM) of voice frequencies to transmit packetized voice data over a communications network. Appendix I of G.711 is a standard describing a "high quality low-complexity algorithm for packet loss concealment with G.711." G.711 describes the PLC algorithms as "frame erasure concealment algorithms," that "hide transmission losses in an audio system where the input signal is encoded and packetized at a transmitter, sent over a network, and received at a receiver that decodes the packet and plays out the output."

FIG. 1 illustrates a block flow diagram of an implementation of a receiver and decoder that uses features from ITU G.711 Appendix I. The figure shows a receiver 10 that maintains two data buffers that are used by a PLC module 22, history buffer 24 and pitch buffer 26. A data stream 12 is normally processed through the voice playout unit 14 in a receiver 10. If there are no lost packets in packet stream 12, then the VPU 14 sends its output data stream to voice decoder 16, which decodes the voice payload from each received packet 12. After the decoder 16, decoded voice data is sent through a switch 18 to and through various processes that are understood in the art to produce an audio output at audio port 20. Whether or not there is packet loss, the VPU 14 output is also saved into history buffer 24 on an ongoing basis. The history buffer 24 has a length of 48.75 ms worth of voice data samples. This length is equivalent to 390 samples for a 8 KHz sample rate. The history buffer 24 is constantly updated from samples from the VPU 14.

Pitch buffer 26 is the same length as the history buffer 24 and is used as a working buffer during a period of packet loss. Pitch buffer 26 is updated from the history buffer 24 at the occurrence of the first packet loss and is maintained for a period of consecutive losses. During the packet loss, the PLC algorithm generates a synthesized signal from the last received pitch period with no attenuation into the pitch buffer 26, which can then be added to the decoded stream from 16 through switch 18 or other device for playout at audio port 22. The history buffer is updated through each loss with the synthesized output as the erasure progresses.

The G.711 PLC algorithm adds a 3.75 ms delay, which is equivalent to 30 samples at 8 KHz. This delay is used for an Overlap Add (OLA) at the start of an erasure and at the end of the erasure. This allows the algorithm to perform smooth transitions between real and synthetic generated speech, and vice-versa. The synthesized speech from the pitch buffer is continued beyond the end of the erasure and then the generated speech is mixed with the real speech using OLA.

The delay is to provide a smooth transition from a good frame to the first reconstructed frame. This avoids clicks in the audio caused by discontinuity between the good frames and the reconstructed frames, output that is unpleasant to the listener.

For some applications, however, the aspects of delay, memory consumption, and processing resources (e.g., MIPS) consumption associated with the G.711 Appendix I PLC algorithm are not acceptable. G.711 Appendix I standards can achieve high voice quality but require 3.75 ms of delay and a 48.75 ms history buffer that consumes approximately 1 MIPS per channel. Under the standards of G.711 Appendix I, the packet loss concealment algorithm reduces channel density by up to 30% while actual packet losses in a stable network usually occur less in less than one percent of all data transmissions. Even though a single incident of degradation of quality caused by packet loss can subjectively cause significant problems to the perceived call quality by an end user, a significant amount of MIPS are consumed by the prior art PLC algorithm to address a very low packet loss rate.

SUMMARY OF THE INVENTION

The present invention improves over the prior art packet loss concealment (PLC) algorithms, such as the ITU G711 Appendix I PLC algorithm that uses the pitch period to reproduce lost packets, by using the spectral analysis filter to determine a maximum repeatable waveform range to reproduce lost packets. The present invention also uses the filter memory to smooth a signal gap, which removes the 3.75 ms delay that is necessary in the G.711 Appendix I PLC algorithm and thereby uses fewer processing resources. The present invention provides similar or better objective and subjective speech quality as the G.711 Appendix I standard.

BRIEF DESCRIPTION OF THE DRAWINGS

For a better understanding of the nature of the present invention, its features and advantages, the subsequent detailed description is presented in connection with accompanying drawings in which.

DETAILED DESCRIPTION OF THE INVENTION

Figure 4:
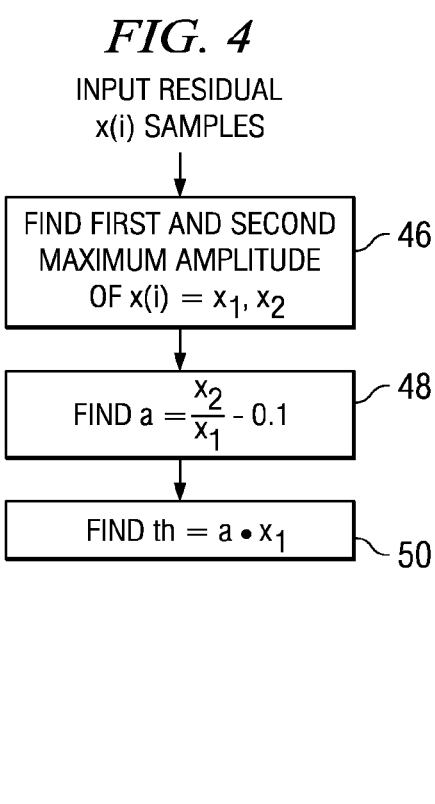
FIG. 4 is a flowchart of determining thresholds for determining peak positions of a residual signal.

The present invention includes a method to reduce the memory and processing resources requirements for a packet loss concealment (PLC) algorithm. The method of the preferred embodiment is applied to an ITU G.711 PLC algorithm and is illustrated by the flowchart in FIG. 2. When a receiver 10 determines that a packet from the incoming packet stream is lost 28, the preferred algorithm analyzes 20 ms of samples that have been saved into the history buffer through a spectral analysis filter 30. A spectral analysis filter filters samples for parameters of audible speech that produce the inflections of sound encoded in voice data such as impulse and excitations. FIG. 4 illustrates a block diagram of a spectral analysis filter A(z) 42 that receives input samples 40. The spectral analysis filter A(z) 42 is a linear predictor with prediction coefficients, $a_i$, that is defined as a system whose output is $$r(n) = \sum_{i=0}^{n} a_i s(n - i)$$

where r(n) is the sample index of the residual samples in time domain. A filter of an $n^{th}$ order linear predictor is the polynomial $$A(z) = \sum_{i=0}^{n} a_i z^{-1}$$

Residual, or prediction error, samples R(z) are obtained from applying the spectral analysis filter to the incoming voice samples using the formula R(z)=A(z)S(z), where S(z) are the voice samples 12 that are used to determine if a bad frame 28 has occurred in the packet flow stream. The output 44 of spectral analysis filter 42 are 20 ms of residual samples r(x) 44 from the filtered input speech samples 40. The spectral analysis filter 42 calculates spectral analysis coefficients of the input samples 40. It is these coefficients which will be later fed into an inverse spectral analysis filter that filters a reconstructed residual sample in order to provide a synthesized packet that replaces or "conceals" the packet that was lost.

Figure 1:
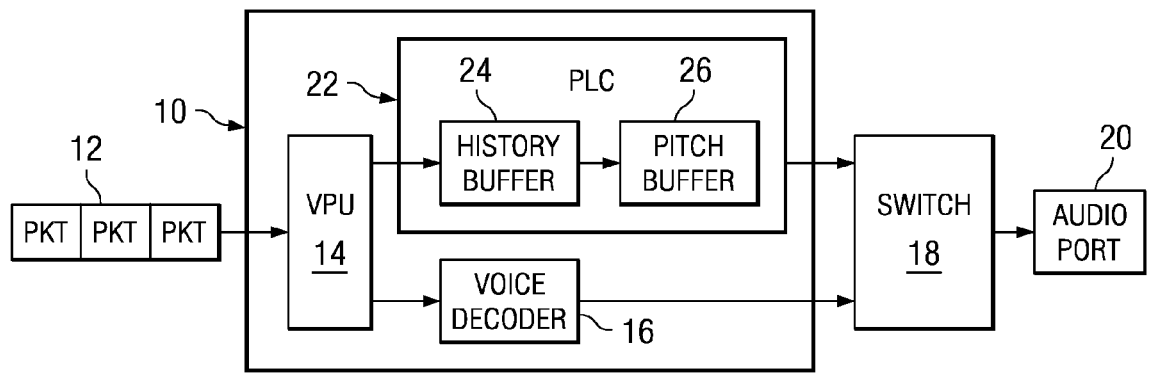
FIG. 1 is an illustration a receiver with a voice playout unit and buffers used by a packet loss concealment algorithm.
Figure 2:
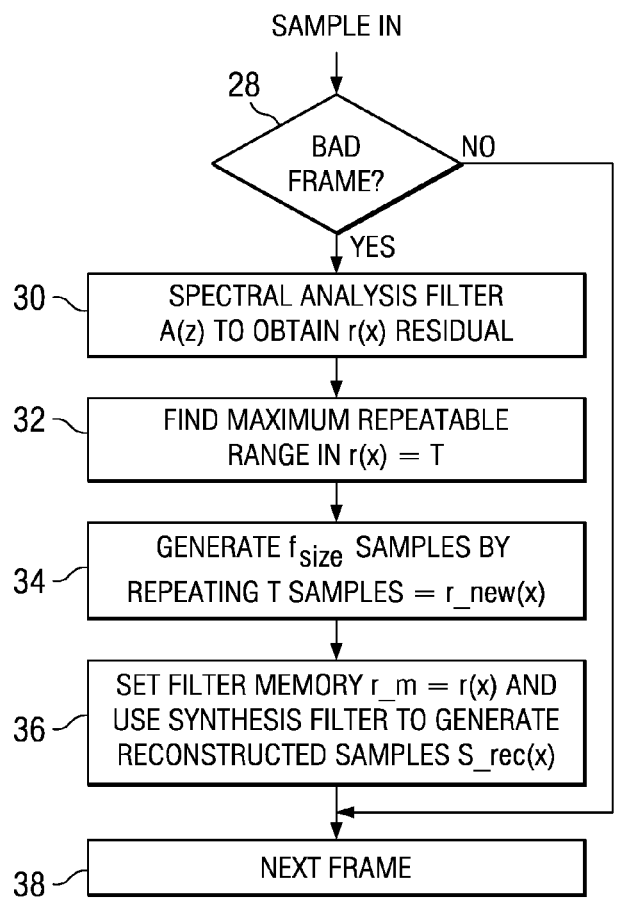
FIG. 2 is a flowchart of the preferred embodiment of the packet loss concealment method.
Figure 3:
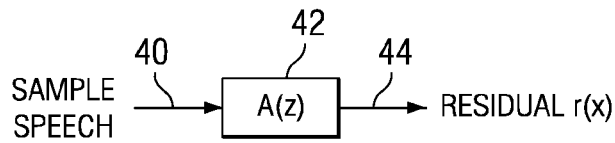
FIG. 3 is an block diagram of the of a spectral analysis filter.
Figure 5:
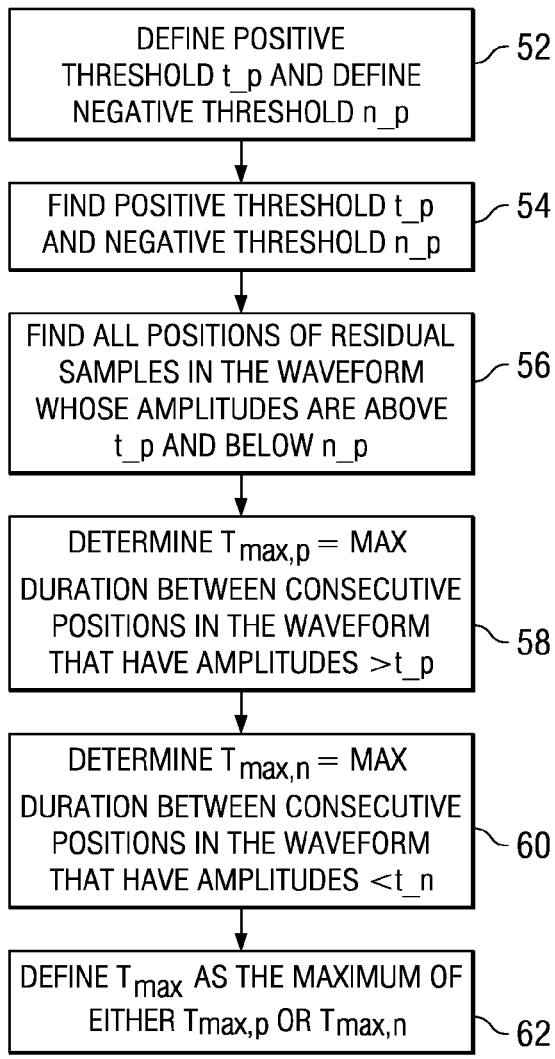
FIG. 5 is a flowchart of defining a repeatable waveform period.

The next step is illustrated in block 32 of FIG. 2, which describes a process to calculate a maximum repeatable range T within the 20 ms of residual samples r(x) 44 in the residual waveform. This method is illustrated using the flowchart diagrams in FIGS. 4 and 5 and an exemplary residual waveform in FIG. 6. The method first 46 analyzes each individual samples x(i) of residual r(x) from step 30 to determine the first maximum amplitude and the second maximum amplitude of samples x(i) 48. The first maximum amplitude is labeled $x_1$ and the second maximum amplitude is labeled $x_2$. Next, in step 48 a ratio α of the two maximum amplitudes are calculated. The formula divides $x_2$ by $x_1$ and subtracts 0.1 according to:

$$\alpha = \frac{x_2}{x_1} - 0.1$$

The ratio is then used to determine a threshold formula 50 for the amplitude. The threshold th is calculated by finding the product of the ratio α and the first maximum amplitude $x_1$ according to the equation $th = \alpha \cdot x_1$.

Figure 6:
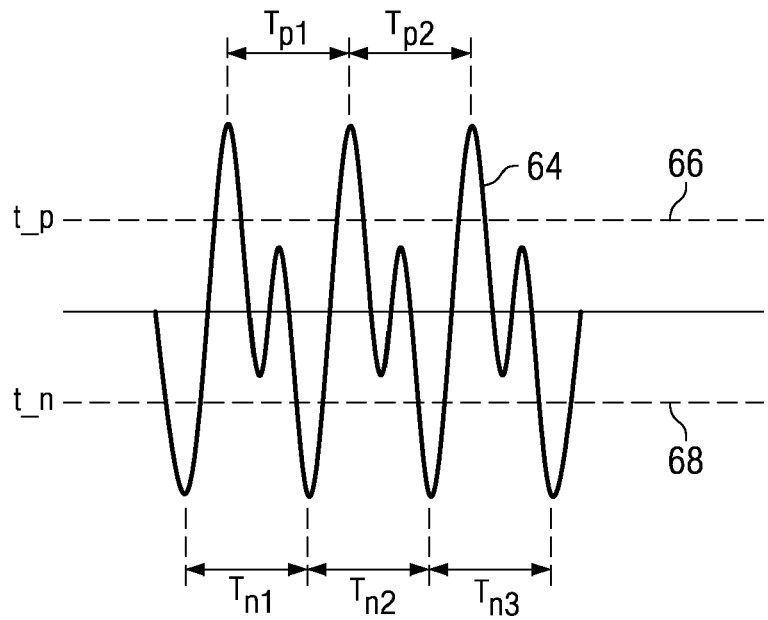
FIG. 6 is an illustration of an exemplary residual waveform.

Once the threshold formula is determined, then in step 52 two thresholds are defined. Referring contemporaneously to FIG. 6, the concept of the positive and negative thresholds are defined on an exemplary waveform 64. The threshold formula in 50 is used in step 52 to define a positive threshold t_p and a negative threshold t_n for the waveform 64. In step 54, a positive threshold t_p 66 and a negative threshold t_n 68 are then calculated using the maximum positive amplitude and the minimum negative amplitude of x(i), respectively.

Based on the positive and negative thresholds, the next step 56 is to determine all positions of residual samples whose amplitudes are above the positive threshold t_p 66 and all positions of residual samples whose amplitudes are below negative threshold t_n 68. After these positions are determined, the next step 58 is to determine a maximum time period duration between consecutive positions of the waveform 64 that are above positive threshold t_p 66. In FIG. 6, the duration between positive amplitudes above positive threshold t_p 66 are shown as $T_{p1}$ and $T_{p2}$. The maximum duration $T_{max, p}$ from these two durations is calculated from choosing the largest time period out of all durations measured and is shown as:

$$T_{max, p} = \{T_{p1}, T_{p2}\}.$$

In step 60, a similar procedure is used to determine a maximum time period duration between consecutive positions of the waveform 64 that are below negative threshold t_n 68. In FIG. 6, the duration between negative amplitudes below negative threshold t_p 66 are shown as $T_{n1}$, $T_{n2}$, and $T_{n3}$. The maximum duration $T_{max, n}$ from these three durations is calculated from choosing the largest time period out of all durations measured and is shown as:

$$T_{max, n} = \{T_{n1}, T_{n2}, T_{n3}\}.$$

Finally, in step 62, a duration T is determined as the maximum duration of either one of $T_{max, p}$ and $T_{max, n}$. The maximum duration is calculated as:

$$T_{max} = \{T_{max, p}, T_{max, n}\}$$

The result of calculating $T_{max}$ is the definition of the time period T.

Referring again to FIG. 2, once T is known the next step 34 generates frame samples ($f_{size}$) by repeating T samples. This step generates a new set of residual samples of 20 ms buffer time denominated r_new(x) made of multiple samples of T samples.

In step 36, the spectral synthesis filter 42 memory r_m (x) is set to r(x) for cases where the filter may require more memory for an expanded r(x). Then, the reconstructed voice sample is generated s_rec(x) using $$\frac{1}{A(z)} 72.$$

Figure 7:
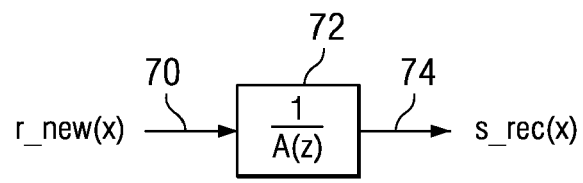
FIG. 7 is a flow diagram for generation of reconstructed voice samples.

FIG. 7 is an exemplary flow diagram illustrating this procedure. In FIG. 7, the generated $f_{size}$ samples (r_new(x)) that were created from repeating T samples are used as input 70 into an synthesis filter $$\frac{1}{A(z)} 72.$$

The output 74 of the synthesis filter 72 is reconstructed voice samples 74. These synthesized signals are then used to replace the lost packet in the voice data stream.

Since the frames are synthesized using the maximum repeatable waveform determination spectral analysis filter memory is used to smooth the signal gap and the recreated frame does not need the overlap and add (OLA) operation specified in G.711 Appendix I to smoothly transition into the real voice signal. Thus, the preferred embodiment does not require a delay, such as the 3.75 ms specified in G.711 Appendix I, for the synthetic signal to transition into the real signal.

Referring again to FIG. 2, if after packets 12 are received into the VPU 14 there are no bad frames 28, then the packet reconstruction method of the present invention is bypassed and the VPU moves on to analyze the next frame 38.

The present invention lower MIPS costs for equivalent or better PLC performance. Generally, the higher the order of spectral analysis filter polynomials, the higher the MIPS costs rise to process the voice samples. The preferred embodiment provides for lower-order filter equations that have a lower MIPS cost and do not negatively impact the overall performance of the PLC algorithm. Table 1 below shows PESQ MOS (Perceptual Evaluation of Speech Quality Mean Opinion Scores) results for various $I_p$ polynomial order of filter equations run against different durations of total signal loss in milliseconds. The MOS scores are based upon ITU-T Recommendation P.862, "Perceptual Evaluation of Speech Quality, an Objective Method for End-to-End Speech Quality Assessment of Narrow-Band Telephone Networks and Speech Codecs."

| $I_p$ | 10 ms | 20 ms | 30 ms | 40 ms |
|---|---|---|---|---|
| 10 | 3.99 | 3.94 | 3.78 | 3.49 |
| 4 | 4.02 | 3.94 | 3.76 | 3.46 |
| 3 | 3.74 | 3.76 | 3.46 | 3.20 |
| 2 | 3.52 | 3.53 | 3.66 | 3.19 |

The above results show that using a 4th order filter in the present invention will result in nearly the same speech quality as using a 10th order filter. This clearly results in the present invention saving processing resources with lower order filters that result in the same speech quality as much higher order filters.

One skilled in the art will appreciate that the present invention can be practiced by other than the described embodiments, which are presented for purposes of illustration and not limitation, and the present invention is limited only by the claims that follow.

What is claimed is:

1. A method for packet loss concealment in a communications network, comprising:
   receiving voice data packets into a receiver, wherein one of the voice data packets is lost;
   determining a maximum repeatable waveform in real voice signals from said received packets using a spectral analysis filter, comprising:
      producing residual signals of said real voice signals through said spectral analysis filter;
      calculating a positive threshold and a negative threshold for said waveform;
      determining a first maximum duration between consecutive positions in said waveform that are above said positive threshold;
      determining a second maximum duration between consecutive positions in said waveform that are below said negative threshold;
   generating a synthesized voice signal based on said maximum repeatable waveform; and replacing said lost voice signals with said synthesized voice signal.

2. The method of claim 1, further comprising:
using a filter memory from said spectral analysis filter to smooth a transition gap between said synthesized voice signal and said real voice signals.

3. The method of claim 1, wherein said generating further comprises generating said synthesized samples by filtering said generated frame size samples through an inverse of said spectral analysis filter.

4. The method of claim 1, wherein said generating comprises using a synthesis filter of an order below a 10th order filter.

5. The method of claim 4, wherein said generating comprises using a 4th order synthesis filter.

6. A method for packet loss concealment in a communications network, comprising:
receiving voice data packets into a voice playout unit of a receiver;
detecting a lost voice data packet during said receiving;
producing residual signals of real voice signals within said received packets through a spectral analysis filter;
determining a maximum repeatable waveform of said residual signals, comprising:
finding a ratio of a first and a second maximum amplitude of said residual samples;
calculating a threshold by determining the product of said ratio and said first maximum amplitude;
generating frame size samples by repeating said maximum repeatable waveform;
generating synthesized samples by filtering said generated frame size samples through an inverse of said spectral analysis filter.

7. The method of claim 6, wherein said determining residual signals creates spectral analysis filter coefficients that are used in said inverse of said spectral analysis filter in said generating synthesized samples step.

8. The method of claim 6, further comprising:
setting memory of said inverse of said spectral analysis filter to a size greater than a memory size of said spectral analysis filter.

9. The method of claim 6, wherein said determining a maximum repeatable waveform comprises determining a positive threshold and a negative threshold of said residual samples using said calculating a threshold.

10. The method of claim 9, wherein said determining a maximum repeatable waveform comprises finding all positions of said residual samples whose amplitudes are beyond said positive threshold and said negative threshold.

11. The method of claim 10, wherein said determining a maximum repeatable waveform comprises finding a maximum duration between consecutive said positions whose amplitudes are greater than said positive threshold.

12. The method of claim 10, wherein said determining a maximum repeatable wavelength range comprises finding a maximum duration between consecutive said positions whose amplitudes are less than said negative threshold.

13. The method of claim 6, wherein said generating comprises using a synthesis filter of an order below a 10th order filter.

14. The method of claim 13, wherein said generating comprises using a 4th order synthesis filter.

* * * * *